US009092975B2

(12) United States Patent
Pepitone et al.

(10) Patent No.: US 9,092,975 B2
(45) Date of Patent: Jul. 28, 2015

(54) AIRCRAFT SYSTEMS AND METHODS FOR DISPLAYING VISUAL SEGMENT INFORMATION

(75) Inventors: Dave Pepitone, Sun City West, AZ (US); Roger W. Burgin, Scottsdale, AZ (US)

(73) Assignee: HONEYWELL INTERNATIONAL INC., Morristown, NJ (US)

(*) Notice: Subject to any disclaimer, the term of this patent is extended or adjusted under 35 U.S.C. 154(b) by 116 days.

(21) Appl. No.: 13/033,369

(22) Filed: Feb. 23, 2011

(65) Prior Publication Data

US 2012/0215388 A1 Aug. 23, 2012

(51) Int. Cl.
*B64D 45/00* (2006.01)
*G06F 19/00* (2011.01)
*G08G 5/00* (2006.01)
*G08G 5/02* (2006.01)
*G01C 23/00* (2006.01)

(52) U.S. Cl.
CPC ............ *G08G 5/0021* (2013.01); *G01C 23/005* (2013.01); *G08G 5/025* (2013.01)

(58) Field of Classification Search
None
See application file for complete search history.

(56) References Cited

U.S. PATENT DOCUMENTS

| | | | | |
|---|---|---|---|---|
| 4,040,005 A * | 8/1977 | Melvin | ........................ | 340/973 |
| 4,210,930 A | 7/1980 | Henry | | |
| 4,368,517 A * | 1/1983 | Lovering | ........................ | 701/16 |
| 4,599,070 A | 7/1986 | Hladky et al. | | |
| 5,289,185 A | 2/1994 | Ramier et al. | | |
| 5,566,073 A * | 10/1996 | Margolin | ........................ | 701/454 |
| 5,745,054 A * | 4/1998 | Wilkens | ........................ | 340/972 |
| 5,798,713 A | 8/1998 | Viebahn et al. | | |
| 6,111,526 A * | 8/2000 | Aymeric et al. | ............... | 340/972 |
| 6,121,899 A * | 9/2000 | Theriault | ........................ | 340/967 |
| 6,157,876 A * | 12/2000 | Tarleton et al. | ................. | 701/16 |
| 6,320,579 B1 | 11/2001 | Snyder et al. | | |
| 6,486,799 B1 * | 11/2002 | Still et al. | ........................ | 340/974 |
| 6,903,752 B2 * | 6/2005 | Ebersole et al. | .............. | 345/632 |
| 7,196,329 B1 | 3/2007 | Wood et al. | | |
| 7,209,053 B2 | 4/2007 | Gannon | | |
| 7,216,069 B2 | 5/2007 | Hett | | |
| 7,295,901 B1 * | 11/2007 | Little et al. | ........................ | 701/16 |
| 7,382,288 B1 * | 6/2008 | Wilson et al. | ................. | 340/972 |
| 7,603,209 B2 | 10/2009 | Dwyer et al. | | |
| 7,619,626 B2 * | 11/2009 | Bernier | ........................ | 345/427 |

(Continued)

FOREIGN PATENT DOCUMENTS

EP  1950532 A2  7/2008
EP  2182326 A1  5/2010

(Continued)

OTHER PUBLICATIONS

EP Search Report, EP 12156601.2-1803 dated Feb. 22, 2013.

(Continued)

*Primary Examiner* — John R Olszewski
*Assistant Examiner* — Jean-Paul Cass
(74) *Attorney, Agent, or Firm* — Ingrassia Fisher & Lorenz, P.C.

(57) ABSTRACT

A display system and method are provided for an aircraft. The system includes a processing unit configured to determine a visual segment for the aircraft and to generate display commands based on the visual segment; and a display device coupled the processing unit and configured to receive the display commands and to display symbology representing the visual segment as a visual segment marker.

9 Claims, 4 Drawing Sheets

(56) References Cited

U.S. PATENT DOCUMENTS

| | | | |
|---|---|---|---|
| 7,679,528 B1 | 3/2010 | Etherington et al. | |
| 7,796,055 B2 * | 9/2010 | Clark et al. | 340/972 |
| 7,813,845 B2 * | 10/2010 | Doose et al. | 701/16 |
| 7,852,236 B2 * | 12/2010 | Feyereisen et al. | 340/971 |
| 7,974,773 B1 * | 7/2011 | Krenz et al. | 701/120 |
| 7,986,249 B2 * | 7/2011 | Wilson et al. | 340/972 |
| 8,032,267 B1 * | 10/2011 | Simon | 701/4 |
| 8,095,249 B2 * | 1/2012 | Little et al. | 701/3 |
| 8,116,975 B2 * | 2/2012 | Stavaeus et al. | 348/144 |
| 8,125,352 B2 * | 2/2012 | Dubourg et al. | 340/980 |
| 2002/0099528 A1 | 7/2002 | Hett | |
| 2004/0044446 A1 * | 3/2004 | Staggs | 701/16 |
| 2005/0007386 A1 * | 1/2005 | Berson et al. | 345/633 |
| 2005/0161603 A1 * | 7/2005 | Kerr | 250/330 |
| 2006/0195235 A1 * | 8/2006 | Ishihara et al. | 701/16 |
| 2006/0200279 A1 * | 9/2006 | Ainsworth et al. | 701/16 |
| 2006/0241820 A1 * | 10/2006 | Dwyer et al. | 701/3 |
| 2007/0002078 A1 * | 1/2007 | He et al. | 345/633 |
| 2007/0075244 A1 * | 4/2007 | Kerr | 250/330 |
| 2007/0115141 A1 * | 5/2007 | Kaminski et al. | 340/947 |
| 2008/0027596 A1 * | 1/2008 | Conner et al. | 701/16 |
| 2008/0252489 A1 * | 10/2008 | Naimer et al. | 340/971 |
| 2009/0207048 A1 | 8/2009 | He et al. | |
| 2009/0293012 A1 * | 11/2009 | Alter et al. | 715/810 |
| 2010/0026525 A1 | 2/2010 | Feyereisen et al. | |
| 2010/0036552 A1 * | 2/2010 | Pepitone et al. | 701/18 |
| 2010/0039295 A1 * | 2/2010 | Dubourg et al. | 340/980 |
| 2010/0207026 A1 * | 8/2010 | Kerr | 250/330 |
| 2010/0287500 A1 * | 11/2010 | Whitlow et al. | 715/810 |
| 2010/0295706 A1 * | 11/2010 | Mathan et al. | 340/951 |
| 2011/0106343 A1 | 5/2011 | Burgin et al. | |
| 2011/0304479 A1 * | 12/2011 | Chen et al. | 340/951 |
| 2012/0026190 A1 * | 2/2012 | He et al. | 345/633 |

FOREIGN PATENT DOCUMENTS

| | | |
|---|---|---|
| EP | 2221583 A2 | 8/2010 |
| EP | 2234088 A2 | 9/2010 |
| EP | 2244239 A2 | 10/2010 |

OTHER PUBLICATIONS

EP Office Action, EP 12 156 601.2 dated May 23, 2013.

USPTO Office Action, Notification Date Feb. 9, 2015; for U.S. Appl. No. 13/931,224.

* cited by examiner

AIRCRAFT SYSTEMS AND METHODS FOR DISPLAYING VISUAL SEGMENT INFORMATION

TECHNICAL FIELD

The present invention generally relates to aircraft systems and methods, and more particularly, to aircraft systems and methods for displaying visual segment information to assist pilots in landing situations.

BACKGROUND

Landing is one of the most demanding tasks in flying. During the landing approach, the pilot must evaluate if the aircraft may safely land or if the landing attempt should be aborted. In addition to monitoring various flight instruments and navigating the aircraft, Federal Aviation Administration (FAA) regulations require a pilot to visibly identify certain runway environment or runway surface references in a predefined visual segment in front of the aircraft. Generally, the visual segment is defined by the FAA by the ability to visually identify ground references at a certain distance and under certain defined visibility conditions. Issues that may obscure the visual segment may include the aircraft design, such as the window configuration, weather visibility, angle of approach, and the like. As such, at a predetermined approach point (e.g., a decision height), the pilot is required to look out of the window and identify these runway or runway environment references. Upon positive identification, the pilot may continue the approach and land the aircraft. If the pilot is unable to visibly confirm the runway or runway environment references, the pilot must abort the landing and execute a missed approach. The time allocated to this task is very limited given the airspeed of the aircraft and the typical or nominal reaction time of the pilot to see and recognize such references at the decision height. Estimating the visual segment and identifying the runway references may be a challenge in some circumstances, particularly in nighttime, low visibility, turbulent or crosswind situations that may make it difficult for the pilot to quickly locate and identify the references.

Computer generated aircraft displays have become highly sophisticated and capable of displaying a substantial amount of flight management, navigation, and control information that gives flight crews more effective control of the aircraft and a reduction in workload during a normal flight situation and/or a low visibility, instrument situation. In this regard, electronic displays, such as head up displays (HUDs) and head down displays (HDDs), are used in aircraft as primary flight displays. For example, the primary flight display can combine critical flight instrumentation (e.g., altitude, attitude, heading, airspeed, vertical speed instruments) and primary engine instrument indicators into a single, readily interpretable display. Although conventional primary flight displays may provide some assistance to the pilot during normal and instrument situations, such displays are typically not as helpful during landing situations, particularly in tasks such as identifying the runway references during approach.

Accordingly, it is desirable to provide systems and methods that improve situational awareness and assist the pilot in identifying runway references during a landing situation. Furthermore, other desirable features and characteristics of the present invention will become apparent from the subsequent detailed description of the invention and the appended claims, taken in conjunction with the accompanying drawings and this background of the invention.

BRIEF SUMMARY

In accordance with an exemplary embodiment, a display system is provided for an aircraft. The system includes a processing unit configured to determine a visual segment for the aircraft and to generate display commands based on the visual segment; and a display device coupled the processing unit and configured to receive the display commands and to display symbology representing the visual segment as a visual segment marker.

In accordance with another exemplary embodiment, a method is provided for displaying symbology during a landing operation of an aircraft onto a runway. The method includes presenting a synthetic view of a runway environment; determining a visual segment of the aircraft relative to the runway; and displaying the visual segment on the synthetic view of the runway environment.

BRIEF DESCRIPTION OF THE DRAWINGS

The present invention will hereinafter be described in conjunction with the following drawing figures, wherein like numerals denote like elements, and wherein.

DETAILED DESCRIPTION

The following detailed description is merely exemplary in nature and is not intended to limit the invention or the application and uses of the invention. Furthermore, there is no intention to be bound by any theory presented in the preceding background or the following detailed description.

Broadly, exemplary embodiments described herein provide visual display systems and methods for aircraft. More specifically, the visual display systems and methods display images that represent the visual segment associated with the aircraft during a landing situation. The display systems and methods further display the runway references inside the visual segment such that the pilot may more easily identify the runway references on the ground during approach.

Figure 1:
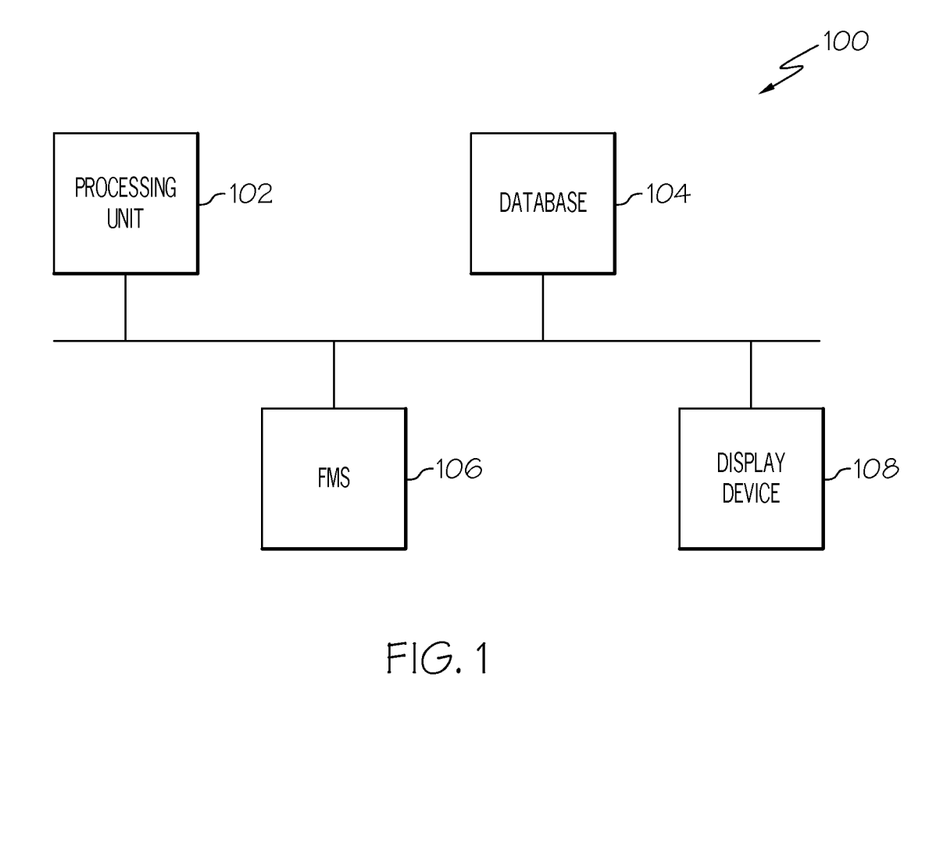
FIG. 1 is a functional block diagram of a system for displaying visual segment information during a landing situation.

FIG. 1 depicts a block diagram of an exemplary aircraft visual display system 100 for displaying visual segment information during a landing situation. In the exemplary embodiment shown, the system 100 includes a processing unit 102, a database 104, a flight management system 106, and a display device 108. Although the system 100 appears in FIG. 1 to be arranged as a single system on a data communications bus or systems bus, the system 100 is not so limited and can also include an arrangement whereby one or more of the processing unit 102, the database 104, the flight management system 106, and the display device 108 are separate components or subcomponents of another system located either onboard or external to an aircraft. Also, for example, the system 100 can be arranged as an integrated system (e.g., aircraft display system, primary flight display system, a head up display with Synthetic Vision Systems (SVS) or Enhanced Vision System (EVS) as an overlay, a "near to eye display" system, or a head mounted display system, etc.) or a subsystem of a more comprehensive aircraft system (e.g., flight management system, navigation and control system, target aiming and control system, collision alert and/or avoidance system, weather avoidance system, etc.). The system 100 may be utilized in an aircraft, such as a helicopter, airplane, or unmanned vehicle. Moreover, equivalent embodiments of the system 100 may also be utilized in spacecraft, ships, submarines, and other types of vehicles. For simplicity, embodiments are described below with reference to "aircraft."

The processing unit 102 can be a computer processor associated with a primary flight display. Generally, the processing unit 102 receives and/or retrieves flight management information (e.g., from the flight management system 106) and landing, target and/or terrain information (e.g., from database 104). The processing unit 102 may function as a graphics display generator to generate display commands based on algorithms or other machine instructions stored in the processing unit 102 or in separate memory components. The display commands may represent navigation and control information such as a zero pitch reference line, heading indicators, tapes for airspeed and altitude, terrain information, flight path information, required navigation performance (RNP) information, and any other information desired by a flight crew. As discussed in further detail below, the processing unit 102 additionally calculates and generates display commands representing a visual segment and runway references. The processing unit 102 then sends the generated display commands to a display device (e.g., the display device 108). More specific functions of the processing unit 102 will be discussed below.

Database 104 is coupled to processing unit 102 and may be a memory device (e.g., non-volatile memory, disk, drive, tape, optical storage device, mass storage device, etc.) that stores digital landing, waypoint, and target location as either absolute coordinate data or as a function of an aircraft's position. Database 104 can also include, for example, a terrain database, which includes the locations and elevations of natural and manmade terrain. Database 104 can additionally include other types of navigation information relating to the calculation of the visual segment and runway references, such as information relating to the aircraft and airport runways. The runway and/or taxiway data may be obtained from airports, Runway Awareness and Advisory System (RAAS), and airport mapping database (AMDB). The runway data may include, for example, the length, altitude and gradient of the intended landing runway. The runway data may also include a map of the airport, which includes data defining the runways at the airport, including the runway identifications, runway markings (e.g., symbols and stripes painted on the surface of the runway) and other references. The runway data can be used to compare aircraft position with various aspects of the runway environment to subsequently generate a synthetic view of the runway environment relative to the aircraft, as discussed below. Data in the database 104 may be uploaded prior to flight or received from external sources, such as an airport transmitter or onboard sensors.

Database 104 may further include aircraft data obtained from the Federal Aviation Administration (FAA) and aircraft manufacturers, such as from aircraft flight manual. The aircraft data may also include aircraft characteristics as a function of, for example, aircraft weight, with corrections based on, for example, wind direction, runway slope, runway surface condition, atmospheric altitude and outside temperature. The aircraft data may also include a list of manufacturer or company regulations defining various aspects of flight, particularly landing. As also discussed below, the aircraft data may further include information such as nose geometry, pilot seated position, pilot eye reference point and windshield configuration.

The flight management system 106 is coupled to processing unit 102, and can provide navigation data associated with the aircraft's current position and flight direction (e.g., heading, course, track, etc.) to the processing unit 102. The navigation data provided to the processing unit 102 can also include information about the aircraft's airspeed, altitude, pitch, and other important flight information. In exemplary embodiments, the flight management system 106 can include any suitable position and direction determination devices that are capable of providing the processing unit 102 with at least an aircraft's current position, the real-time direction of the aircraft in its flight path, the waypoints along the flight path, and other important flight information (e.g., elevation, pitch, airspeed, altitude, attitude, etc.). Information can be provided to the processing unit 102 by, for example, an Inertial Reference System (IRS), Air-data Heading Reference System (AHRS), and/or a global positioning system (GPS).

The system 100 also includes the display device 108 coupled to the processing unit 102. The display device 108 may include any device or apparatus suitable for displaying various types of computer generated symbols and information representing at least pitch, heading, flight path, airspeed, altitude, landing information, waypoints, targets, obstacle, terrain, and RNP data in an integrated, multi-color or monochrome form. Using data retrieved (or received) from the flight management system 106 or database 104, the processing unit 102 executes one or more algorithms (e.g., implemented in software) for determining the position of the various types of desired information on the display device 108. As noted above, the processing unit 102 then generates display commands representing this data, and sends display commands to the display device 108. The display device 108 and/or processing unit 102 may include a graphics display generator for generating the appropriate symbology on the screen of the display device 108, as discussed in greater detail below.

In this embodiment, the display device 108 is an aircraft primary flight display. However, any suitable type of display medium capable of visually presenting multi-colored or monochrome flight information for a pilot or other flight crew member may be provided, such as, for example, various CRT and flat-panel display systems (e.g., CRT displays, LCDs, OLED displays, plasma displays, projection displays, HDDs, HUDs, etc.).

Figure 2:
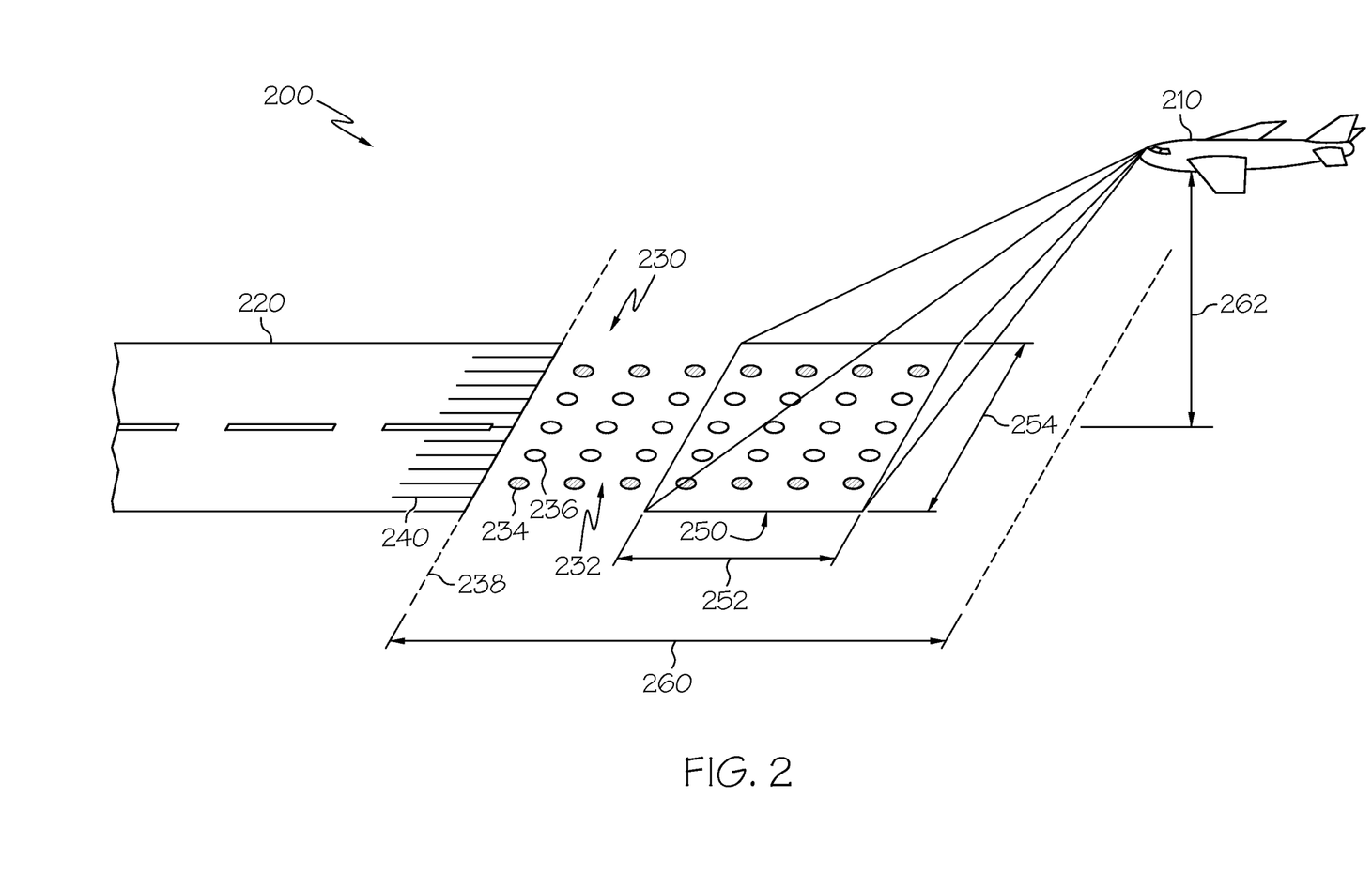
FIG. 2 is an isometric view of an exemplary landing environment used to describe the system of FIG. 1.

FIG. 2 is an isometric view of an aircraft 210 during a landing environment 200, and is useful for describing the system 100 of FIG. 1. FIG. 2 particularly illustrates the aircraft 210 approaching a runway 220. As shown, the runway 220 may have one or more types of runway references or indicia 230. For example, the runway references 230 may include approach lights 232, such as red cross bars 234 and white center lights 236; runway threshold markings 238; and touchdown zone markings 240. Other types of runway references (not shown) may include threshold lights or touchdown zone lights. The type of runway references 230 may depend on the particular airport or runway, but generally, every runway has one or more designated runway references 230.

FAA regulation (or similar flight regulations, including company, state, local or foreign regulations) generally defines a visual segment 250 in front of the aircraft 210 that the pilot should be able to view. The visual segment 250 is typically a two dimensional area on the ground that may, for example, have a rectangular construction with a length 252 and a width 254. The dimensions and construction of the visible segment 250 may depend on a number of factors, some of which are described in greater detail below with reference to FIG. 3.

At a certain point during the approach to the runway 220, for example, at a predetermined distance 260 from the runway or a predetermined altitude 262, the pilot is generally required to visually identify the runway references 230 within the visual segment 250. The point at which this must occur may be referred to as a decision point (or height). In one exemplary embodiment, the runway references 230 may be defined by federal regulation, such as FAR 91.189, incorporated herein by reference. For example, such regulations require that the runway references 230 must be distinctly visible and identifiable to the pilot at or prior to the decision point of the landing approach. In some situations, the amount of time during which the pilot must identify the runway references 230 may be a matter of seconds. If the pilot is able to identify the runway references 230 within the visual segment 250, the pilot may proceed to landing. However, if the pilot is unable to identify the runway references 230, the pilot must abort the landing, fly to an alternate airport, or retry the approach.

Even in ideal situations, it may be difficult to remove attention from cockpit instrumentation or displays, look out the window, orient a visual point of view relative to the runway and aircraft, estimate the position of the visual segment 250, and identify the runway references 230. This task may be more difficult in low visibility conditions or when the aircraft is crabbing during a crosswind, i.e., the longitudinal axis not being aligned with the longitudinal axis of the runway, thus resulting in the runway not appearing directly in front of the pilot. As described in greater detail below, the system 100 (FIG. 1) provides a visual display that enables the pilot to more easily identify the runway references 230 and the visual segment 250.

Figure 3:
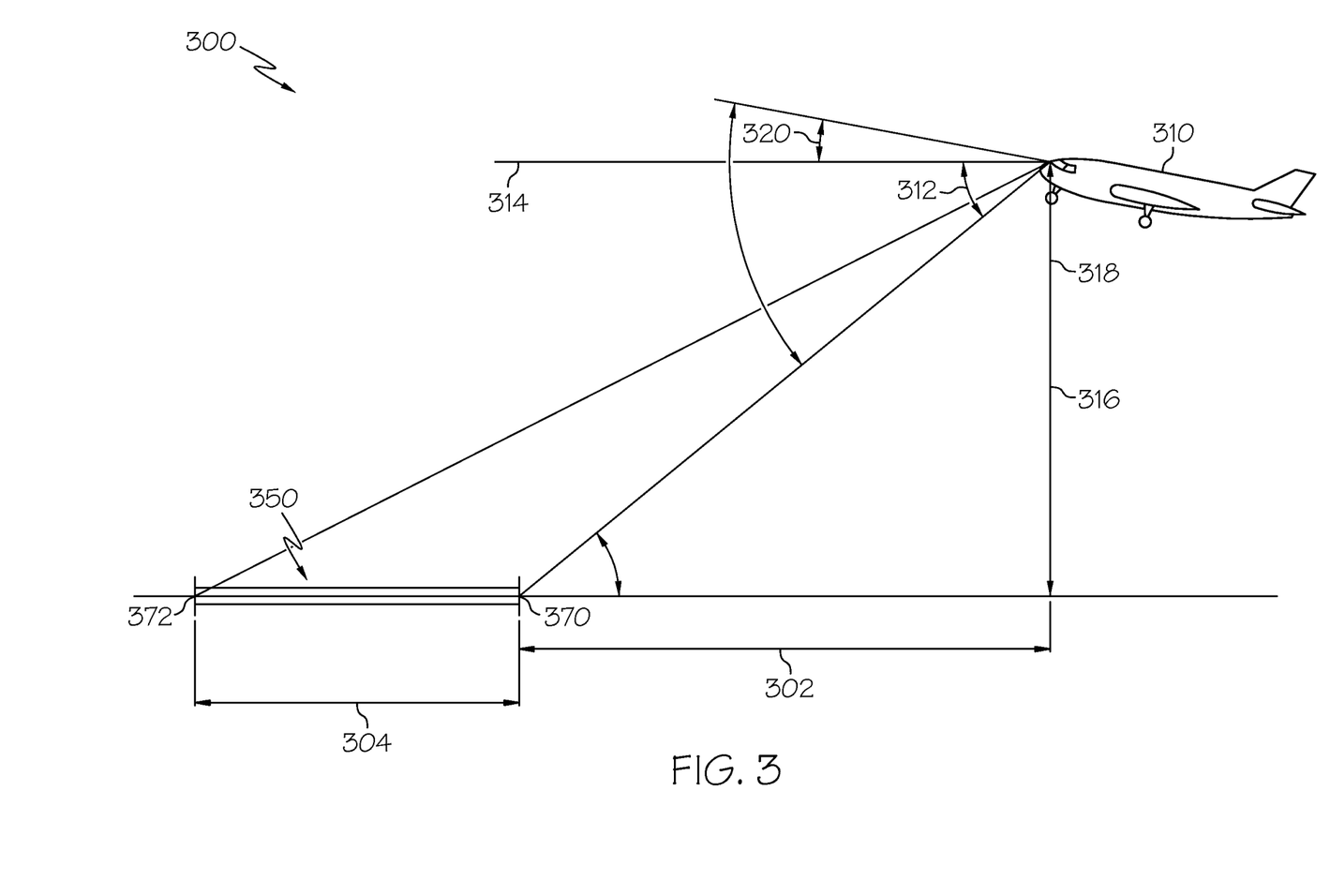
FIG. 3 is an elevation view of the exemplary landing environment used to describe the system of FIG. 1.

FIG. 3 is an elevation view of an exemplary runway environment 300 that is labeled to describe the calculation of a visual segment 350. As described above, the system 100 of FIG. 1 calculates the position of the visual segment 350 relative to an aircraft 310 based on a number of factors. In one exemplary embodiment, the position of the visual segment 350 may be set by government regulation, such as FAA regulations. In general, however, the visual segment 350 has a first boundary 370 that is a predetermined distance 302 from the front of the aircraft 310, and the visual segment 350 extends a predetermined distance 304 to a second boundary 372. As such, the predetermined distance 304 typically corresponds to the length of the visual segment 350. As an example, depending on the type of landing approach, the length 304 may be about 60 meters or 90 meters.

The location of the first boundary 370 may depend on a number of factors, but generally corresponds to the limit of view that the pilot is able to see out of the windshield over the nose of the aircraft, e.g., because the nose of the aircraft 310 prevents the pilot from looking directly down to the ground. As such, the first boundary 370 may depend on the shape of the nose of the aircraft 310 and the angle 312 at which the pilot may see down to the ground resulting from the nose geometry (labeled from the horizontal 314 in FIG. 3). As also shown in FIG. 3, the position of the first boundary 370 may also depend on the elevation 316 of the aircraft 310, the elevation 318 of the pilot relative to the elevation 316 of the aircraft 310, and the pitch 320 of the aircraft 310. As such, the visual segment 350 may be defined as a specified area in front of the aircraft 310 that the pilot should be able to view as the aircraft 310 flies forward.

Although some factors for determining the visual segment 350 are described in association with FIG. 3, any appropriate factor may be considered. In one exemplary embodiment, any suitable algorithm that evaluates one or more of these factors may be stored by the processing unit 102 (FIG. 1) to calculate the visual segment 350 based on data from the flight management system 106 or database 104 (FIG. 1).

Figure 4:
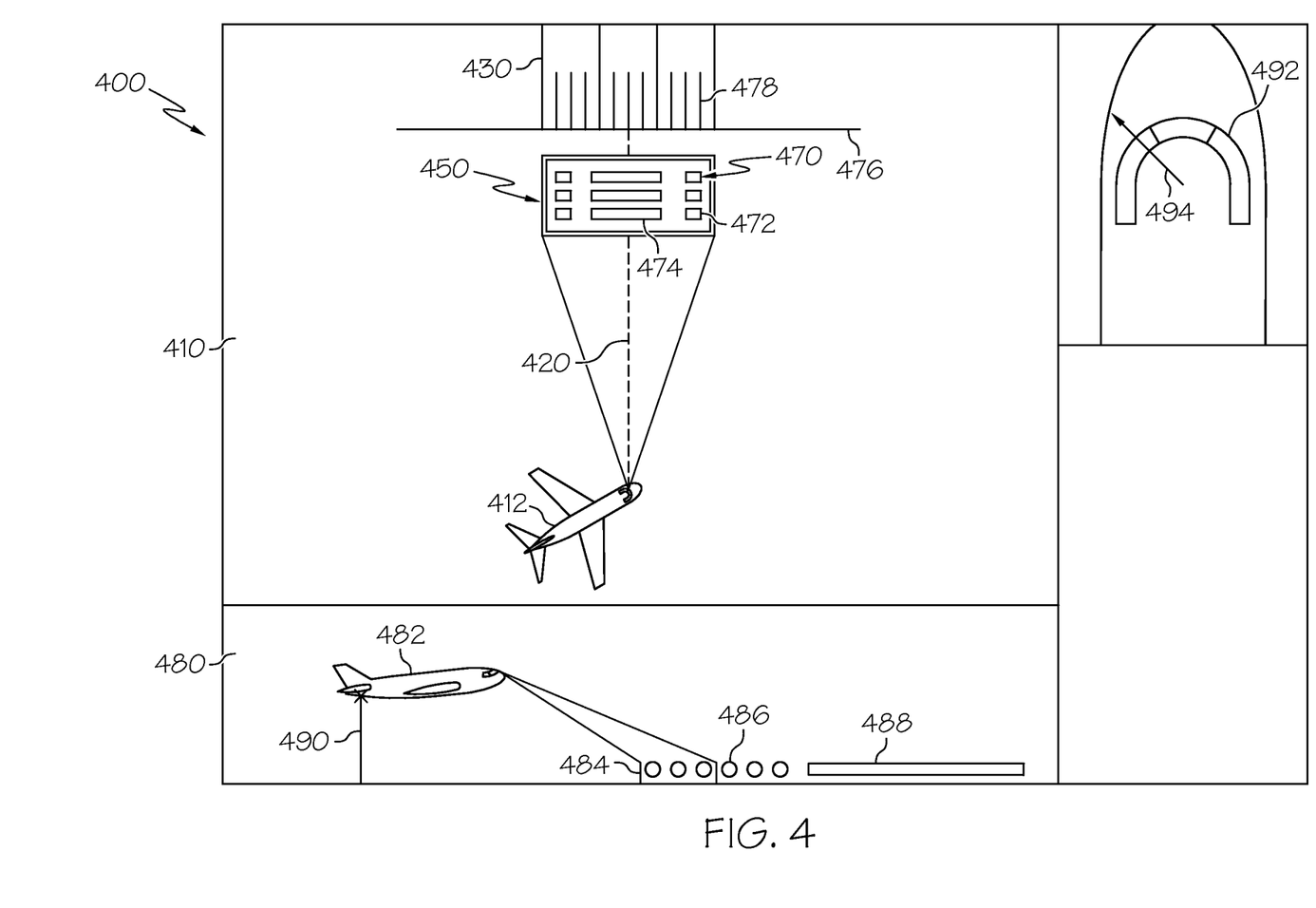
FIG. 4 depicts an exemplary visual display that may be rendered by the system of FIG. 1 during the landing situation.

FIG. 4 depicts an exemplary visual display 400 rendered on an aircraft display device. In one exemplary embodiment, the visual display 400 may be rendered by the system 100 of FIG. 1 on the display device 108. As such, FIGS. 1 and 4 are referenced in the discussion below.

The visual display 400 includes at least a plan view 410 and an elevation view 480 displayed in different areas. Although FIG. 4 shows the plan view 410 and elevation view 480 displayed simultaneously, the views 410 and 480 may also be displayed individually. In general, the plan view 410 and elevation view 480 are multi-color, although one or more may be monochromatic or black and white.

The plan view 410, generally known as a lateral map display, is a computer generated top-view of the aircraft, represented as an aircraft symbol 412, and the surrounding environment. Generally, the pilot may zoom in and out of the plan view 410 to depict the desired display elements. Additionally, the pilot may select elements to be displayed. In the view of FIG. 4, the plan view 410 includes symbology representing the flight path 420 of the aircraft and the runway 430 during a landing situation. As described above, the position and appearance of the symbology representing the flight path 420 and runway 430 may be generated by the processing unit 102 based on input from the database 104 and flight management system 106. Although not shown, other types of symbology may include waypoint symbols, range rings, weather information, terrain information, political boundaries, and navigation aids, such as the horizon line, flight path markers, airspeed, altitude, deviation, and the like.

As shown in FIG. 4, the plan view 410 is centered on the flight path 420, which may or may not be aligned with the aircraft. For example, in the scenario of FIG. 4, the aircraft symbol 412 is not aligned with the flight path 420 or the runway 430, thereby indicating that a crosswind or other flight condition is resulting in the aircraft heading being different than the aircraft track. In other embodiments, the plan view 410 may be based on the aircraft heading.

In addition, and as will now be described in more detail, the plan view 410 of the visual display 400 may also selectively render symbology representing the visual segment as a visual segment marker 450 that outlines or otherwise highlights the position of the visual segment. As described above, the visual segment represented by the visual segment marker 450 is a predefined area on the ground that the pilot should be able to observe. For example, the visual segment marker 450 may represent the visual segments 250 and 350 discussed above in FIGS. 2 and 3. In one exemplary embodiment, the system 100 may calculate the position and dimensions of the visual segment, and thus the visual segment marker 450, based on a number of factors, including the shape of the aircraft, the elevation, and the pitch. These factors may be provided by the database 104 or the flight management system 106 (FIG. 1), and the visual segment marker 450 may be constructed by the processing unit 102 (FIG. 1) for display in the plan view 410.

As described above, during the landing approach, the pilot may be required to identify runway references. As such, the plan view 410 of the visual display 400 further includes symbology representing the runway references as runway reference markers 470. The plan view 410 particularly displays the runway reference markers 470 that are within the visual segment marker 450. As such, upon viewing the plan view 410, the pilot may observe the position of the visual segment marker 450 and runway reference markers 470 to provide information about the position of the visual segment relative to the aircraft and the runway references within that visual segment. For example, in the view of FIG. 4, the relative locations of the aircraft symbol 412 and the visual segment marker 450 indicates to the pilot that the visual segment is to his left.

In FIG. 4, the runway reference markers 470 within the visual segment marker 450 may include the red cross bar markers 472 and white center light markers 474. In general, any runway reference markers may be provided, depending on the runway references located at the airport (e.g., as shown in FIG. 2). In some exemplary embodiments, the plan view 410 also includes runway reference markers 470 positioned outside of the visual segment marker 450, such as the runway threshold markers 476 and touchdown zone markers 478. In other embodiments, only the runway reference markers 470 within the visual segment marker 450 are displayed.

The identification and position of the runway reference markers 470 may be determined based on information from the flight management system 106 and database 104. For example, the database 104 may have a table identifying the location and type of runway reference markers 470 for each runway and airport. The visual display 400 may periodically or continuously update the visual segment marker 450 or runway reference markers 470 to provide an accurate depiction.

In general, the visual segment marker 450 may be rendered in a color that draws attention without resulting in unnecessary clutter. For example, the visual segment marker 450, may be a different color than the runway or surrounding terrain. Similarly, the runway reference markers 470 may be rendered in the actual color of appearance or other color. The runway reference markers 470 within the visual segment marker 450 may be highlighted relative to the runway reference markers 470 outside of the visual segment marker 450 or all of the runway reference markers 470 may have a similar appearance. In one exemplary embodiment, the visual segment marker 450 and the runway reference markers 470 may appear automatically upon approach. In other embodiments, the display of such information may be initiated upon command from the flight crew.

Accordingly, during a landing operation, a pilot may view the plan view 410 on the visual display 400 and immediately identify the position of the visual segment marker 450 and the runway reference markers 470 relative to each other and relative to the position of the aircraft symbol 412. Based on this information, the pilot knows the position of the visual segment on the ground relative to the aircraft, which runway references that he expects to view, and when to expect visual confirmation of such runway references. This enables the pilot to perform the referencing task during a runway operation more quickly and accurately.

As introduced above, the visual display 400 further includes the elevation view 480. The elevation view 480 provides a two-dimensional view of the flight environment and may include one or more of the above-mentioned features that are displayed on the plan view 410. For example, the plan view 410 includes an aircraft symbol 482, a visual segment marker 484, the runway reference markers 486, and the runway 488. The elevation view 480 may further include a lateral indication 490 of the decision height at which the pilot is required to visually confirm the runway references.

In accordance with an exemplary embodiment, the visual display 400 may further include windshield symbology 492 that corresponds the visual appearance of the aircraft windshield. The particular appearance of the aircraft windshield may be stored, for example, in the database 104. Based on information from the database 104 and flight management system 106, the processing unit 102 may determine the relative position of the visual segment and windshield and generate an arrow 494 on the windshield symbology 492 to provide the pilot a visual cue for confirming the visual segment and runway references. For example, the arrow 494 and windshield symbology 492 in the depicted scenario indicates that the pilot should look out of the left side of the windshield to view the visual segment. In some embodiments, the windshield symbology 492 may be incorporated into the plan view 410 or omitted.

Although the visual display 400 is described as a two-dimensional primary flight display, the visual display 400 may also be a three-dimensional synthetic view or a head up display. For example, a head up display may overlay symbology described above on the appropriate position of a see-through viewing element to highlight the visual segment and runway references.

Accordingly, exemplary embodiments provide an accurate representation of the location of the visual segment and runway references. This may increase situational awareness for the flight crew and increase flight safety by providing important information in an advantageously intuitive location and manner, which reduces pilot or operator workload and navigation errors, and thus results in increased aircraft and/or navigation safety.

Exemplary embodiments have been described in terms of functional block diagrams and various processing steps. It should be appreciated that such functional blocks may be realized in many different forms of hardware, firmware, and/or software components configured to perform the various functions. For example, the present invention may employ various integrated circuit components, e.g., memory elements, digital signal processing elements, look-up tables, and the like, which may carry out a variety of functions under the control of one or more microprocessors or other control devices. Such general techniques are known to those skilled in the art and are not described in detail herein. Moreover, it should be understood that the exemplary process illustrated may include additional or fewer steps or may be performed in the context of a larger processing scheme. Furthermore, the various methods presented in the drawing Figures or the specification are not to be construed as limiting the order in which the individual processing steps may be performed. It should be appreciated that the particular implementations shown and described herein are illustrative of the invention and its best mode and are not intended to otherwise limit the scope of the invention in any way.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A display system for an aircraft, comprising:
a processing unit configured to determine a visual segment for the aircraft and to generate display commands based on the visual segment, wherein the visual segment is a two dimensional geographical area on the ground at a predetermined location and defined with a rectangular construction with a predetermined length and a predetermined width; and
a display device coupled the processing unit and configured to receive the display commands and to display symbology representing the visual segment as a visual segment marker, wherein, during a landing situation at a runway, the processing unit is further configured to determine runway references associated with the runway that are within the visual segment, wherein the display commands are further based on the runway references, and wherein the display device is further configured to display symbology representing the runway references as runway reference markers,
wherein the visual segment marker is rendered as an outline on the display device with the generally rectangular construction according to the predetermined length and the predetermined width, and wherein the runway references are rendered within the outline of the visual segment marker,
wherein the processing unit is additionally configured to display runway references associated with the runway that are outside of the visual segment, wherein the display device is configured to highlight the runway references inside the outline of the visual segment relative to runway references outside the outline of the visual segment marker,
wherein the visual segment is defined according to Federal Aviation Administration (FAA) regulation as a function of aircraft position, the visual segment marker having a forward boundary defined at a predetermined distance from the aircraft, and wherein the visual segment has a length of between about 60 meters and about 90 meters.

2. The display system of claim 1, wherein the display device is configured to display an aircraft symbol with the runway reference markers and the visual segment marker to indicate the relative positions of the aircraft, the runway references, and the visual segment.

3. The display system of claim 1, wherein the display device is configured to display the runway reference markers and visual segment marker as a plan view.

4. The display system of claim 1, wherein the display device is configured to display the runway reference markers and visual segment marker as an elevation view.

5. The display system of claim 1, wherein the visual segment markers include at least one of approach light markers, runway threshold markers, and touchdown zone markers.

6. The display system of claim 1, wherein the processing unit is configured to determine the visual segment based on nose geometry of the aircraft.

7. The display system of claim 1, wherein the display commands are further based on a windshield configuration of the aircraft, and wherein the display device is configured to display symbology representing the windshield configuration, and wherein the display device is further configured to display symbology representing an arrow indicating a direction of the visual segment relative to the windshield configuration.

8. The display system of claim 1, wherein the display device is a primary flight display.

9. The display system of claim 1, wherein the display device is a head down display.

* * * * *